United States Patent [19]

Yatsunami

[11] Patent Number: 5,323,451
[45] Date of Patent: Jun. 21, 1994

[54] FACSIMILE DEVICE AND AUTOMATIC RECEIVING METHOD THEREOF

[75] Inventor: Kenroh Yatsunami, Yamatokooriyama, Japan

[73] Assignee: Sharp Kabushiki Kaisha, Osaka, Japan

[21] Appl. No.: 118,691

[22] Filed: Sep. 10, 1993

Related U.S. Application Data

[63] Continuation of Ser. No. 618,612, Nov. 27, 1990, abandoned.

[30] Foreign Application Priority Data

Nov. 29, 1989 [JP] Japan ................... 1-311516

[51] Int. Cl.$^5$ ............................................ H04M 11/00
[52] U.S. Cl. ..................................... 379/100; 379/373
[58] Field of Search .......................... 379/100, 96–99, 379/373–375, 386, 354, 355, 356, 216

[56] References Cited

U.S. PATENT DOCUMENTS

| | | | |
|---|---|---|---|
| 4,496,798 | 1/1985 | Colardelle et al. | 379/375 |
| 4,663,778 | 5/1987 | Takahashi | 379/100 |
| 4,741,029 | 4/1988 | Hase et al. | 379/355 |
| 4,928,306 | 5/1990 | Biswas et al. | 379/201 |
| 4,939,775 | 7/1990 | Houck et al. | 379/373 |
| 5,101,428 | 3/1992 | Koue | 379/100 |

FOREIGN PATENT DOCUMENTS

| | | |
|---|---|---|
| 54-65404 | 5/1979 | Japan . |
| 58-197956 | 11/1983 | Japan . |
| 61-53861 | 3/1986 | Japan . |
| 62-152256 | 7/1987 | Japan . |
| 63-187956 | 8/1988 | Japan . |
| 63-232676 | 9/1988 | Japan . |
| 1-136453 | 5/1989 | Japan . |

Primary Examiner—Wing F. Chan

[57] ABSTRACT

A facsimile device includes an automatic receiving function, in which, after the facsimile device is connected to a line, users can store a match pattern suitable for the connected line. At the stage of production of this facsimile device, no match pattern for an automatic receive mode is stored in this facsimile device, or alternatively, several match patterns corresponding to ringing signals employed in several countries are stored independent of destinations of the facsimile device. This facsimile device includes a characteristic setting mode. In this characteristic setting mode, this facsimile device detects a ringing signal from the line connected thereto and determines characteristic values of the detected ringing signal. The facsimile device sets the determined characteristic values in a match pattern employed in practice for determining whether or not there is a ring to call the facsimile device in the automatic receive mode. Thus, even if installed in any of a plurality of countries, or connected to a PBX that outputs an extraordinary ringing signal, this facsimile device can perform the automatic receiving function.

7 Claims, 7 Drawing Sheets

| MATCH PATTERN | FREQUENCY | SIGNAL FORM |
|---|---|---|
| 1 | 13Hz (16Hz) | 1s ON, 2s OFF |
| 2 |  | 2s ON, 4s OFF |
| 3 | 11.5Hz ~ 70Hz | 2s ON, 2s OFF |
| 4 | 14.5Hz 20Hz (16Hz, 25Hz) | 0.4s / 0.4s / 0.2s, 2s OFF |
| 5 | (20~25Hz) | 1s ON, 4s OFF |
| ⋮ | ⋮ |  |
| N |  | 0.4s / 0.2s |

FACSIMILE DEVICE AND AUTOMATIC RECEIVING METHOD THEREOF

This application is continuation of application Ser. No. 07/618,612 filed on Nov. 27, 1990, which is now abandoned.

BACKGROUND OF THE INVENTION

1. Field of the Invention

The present invention relates generally to facsimile devices and, more particularly, to a facsimile device having an automatic receiving function.

2. Description of the Background Art

Facsimile devices serve as still-picture transmit/receive apparatus for transmitting/receiving via telephone lines a picture signal obtained by decomposing characters, figures, photographs, etc. into a plurality of small pixels by scanning and are in wide use. The facsimile devices are connected with each other via telephone lines through a switchboard. When one of the two facsimile devices connected via telephone lines through the switchboard transmits a picture signal to the other device, the one facsimile device supplies a signal indicating a request-to-send as an output to the switchboard. In response to this applied signal, the switchboard transmits a signal for ringing the bell of a telephone for general use (hereinafter referred to as ringing signal) to the other facsimile device. The facsimile device is connected with the telephone for general use, so that the bell of the connected telephone rings in response to the ringing signal from the switchboard.

There are two or more types of facsimile devices: one has both an automatic receive mode, in which the facsimile device can automatically receive a picture signal in response to a ringing signal from the switchboard, and a manual receive mode, in which the facsimile device is set to be able to receive a picture signal by manual operation of users responding to a ring of the bell of a telephone connected to the device; and the other has only the manual receive mode.

Figure 6:
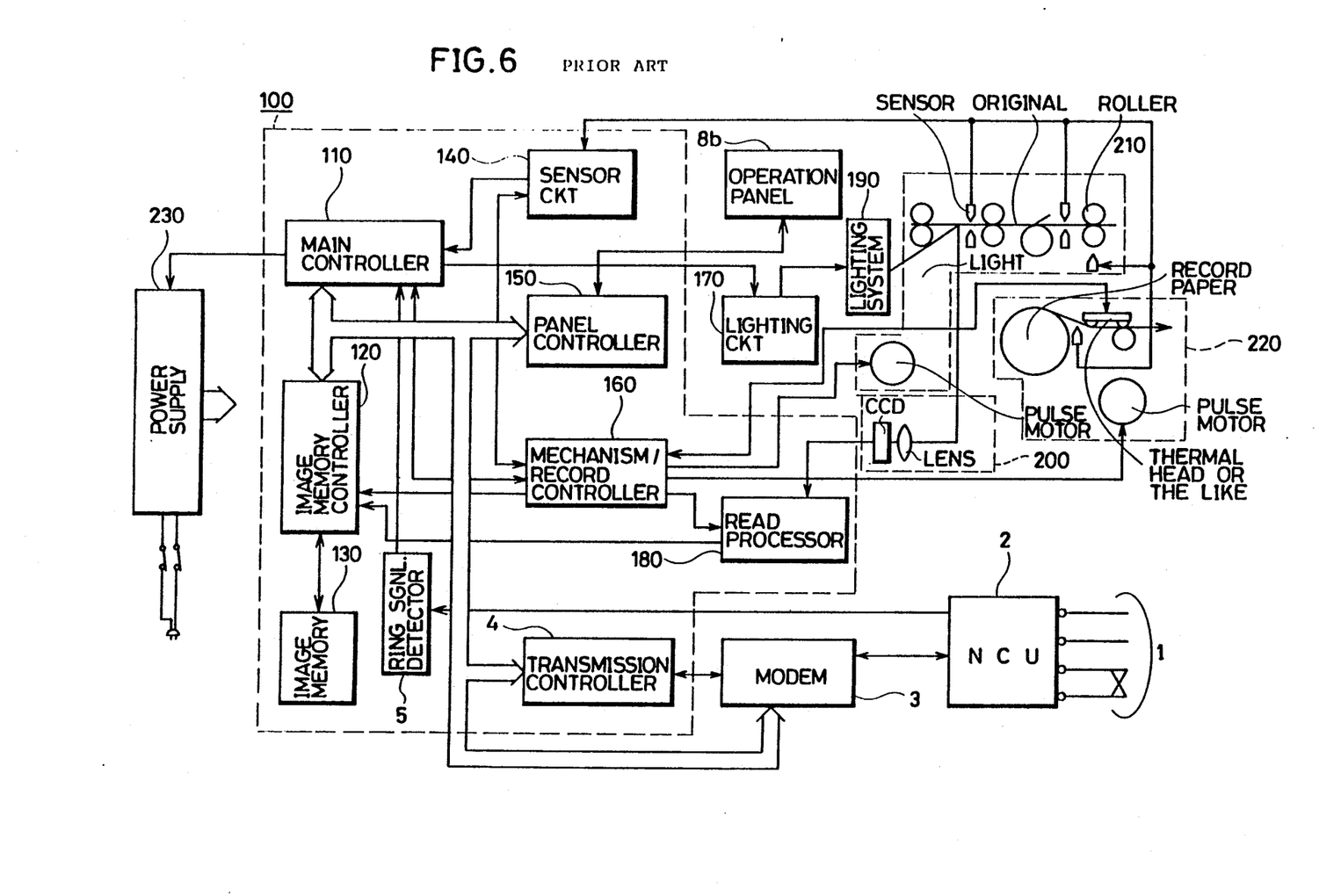
FIG. 6 is a block diagram showing general overall structure of a conventional facsimile device having an automatic receiving function.

FIG. 6 is a schematic block diagram showing general structure of a conventional facsimile device having an automatic receiving function. With reference to FIG. 6, a controller 100 includes a main controller 110, an image memory controller 120, an image memory 130, a sensor circuit 140, a panel controller 150, a mechanism-/record controller 160, a read processor 180, a transmission controller 4, and a ringing signal detecting circuit 5.

An operation panel 8b includes a keying switch, by which users perform mode setting of this facsimile device, starting of transmission/reception and the like, and a display panel for displaying various information for the users' operation. A network control unit (hereinafter referred to as NCU) 2 serves as an interface for coupling lines 1 and the facsimile device. A modem 3 has a function of receiving a picture signal transmitted via lines 1 through NCU 2 and then demodulating the received picture signal in the form of a signal that can be processed in controller 100, i.e., a digital signal, and a function of modulating a picture signal to be transmitted in a signal form that is suitable for transmission via lines 1. An original feeding system 210 serves to feed originals such as paper, on which characters and figures or designs to be transferred are drawn, and photographs into the facsimile device. A lighting system 190 is supplied with power from a lighting circuit 170, to light up the original fed into the facsimile device by original feeding system 210. Reflected light from the original, caused by this lighting up, enters in a read optical system 200. Read optical system 200 includes an image sensor formed such as of CCD (Charge-Coupled Device) image sensing devices. The reflected light from the original forms an optical image of the figures or designs on the original onto a light receiving surface of the image sensor. Thus, read optical system 200 supplies as an output an analog picture signal of one picture frame corresponding to the figures or designs on the original. A recording system 210 serves to print the figures or designs, corresponding to the picture signal received by the facsimile device, on record paper and then to transmit the printed record paper outside the facsimile device. In general, original feeding system 210 includes various sensors for detecting positions of the original, or the like. Similarly, recording system 220 includes sensors for detecting positions of the record paper, or the like.

Sensor circuit 140 supplies information based on output signals of the sensors included in the original feeding system 210 and recording system 220 to main controller 110. Panel controller 150 detects a key entry into operation panel 8b and supplies the detected key entry to main controller 110, and also changes displays on operation panel 8b in response to an instruction from main controller 110. Read processor 180 serves to subject a picture signal in analog form, supplied as an output from read optical system 200, to a predetermined correction processing. Image memory controller 120 serves to convert the picture signal subjected to the correction processing by read processor 180 into image data of a predetermined form and to supply the image data to image memory 130. Image memory 130 stores the image data supplied by image memory controller 120. Image memory controller 120 further reads the image data from image memory 130 and converts the read image data into a picture signal of the original form, to supply the converted signal to main controller 110 and transmission controller 4. Mechanism/record controller 160 controls mechanical operations such as of original feeding system 210 and recording system 220, so that the travelling of the original and record paper, the density of printing onto the record paper, etc. may be appropriate.

In transmission, since a picture signal of the original is supplied as an output from read optical system 200, image data corresponding to this picture signal is once stored in image memory 130, then read and applied to image memory controller 120. Transmission controller 4 provides a processing for transmission (encoding processing) to the picture signal supplied by image memory controller 120 and then applies the processed picture signal to modem 3. Main controller 110 carries out a control for this operation of transmission controller 4 in response to the picture signal supplied as an output from image memory controller 120. As a result, a picture signal corresponding to the figures or designs on the original is transmitted via modem 3 and NCU 2 onto lines 1.

In reception, since a picture signal is supplied as an input to NCU 2 via lines 1, transmission controller 4 provides an opposite processing (decoding) from the foregoing processing for transmission to a picture signal demodulated by modem 3. The picture signal processed by transmission controller 4 is applied to image memory controller 120. Accordingly, image data corresponding to the picture signal received by this facsimile device is stored in image memory 130. The image data stored in image memory 130 at this time is restored to the original picture signal by image memory controller 120 and the restored signal is applied to main controller 110. Main controller 110 controls mechanism/record controller 160 in response to the picture signal supplied by image memory controller 120 at this time so that figures or designs corresponding to the received picture signal may be printed on record paper in recording system 220.

Main controller 110 controls, in practice, the operation of all function portions included in controller 100, and a power supply circuit 230. Power supply circuit 230 is controlled by main controller 110 so as to convert an alternating voltage applied from a power supply for commercial use into a predetermined direct current voltage and to apply the converted voltage to an internal circuit of the facsimile device including controller 100.

Figure 9:
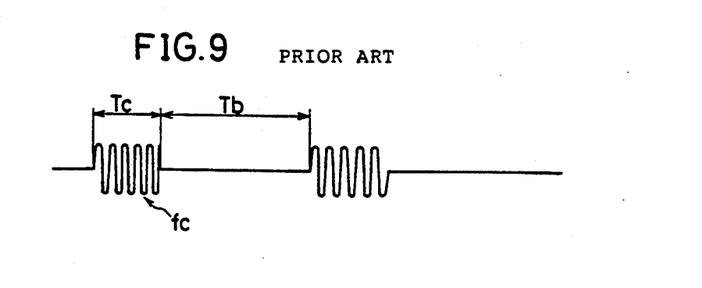
FIG. 9 is a diagram showing a general waveform of a ringing signal.

In order that the facsimile device becomes the above-described receiving state, a ringing signal from a switchboard (not shown) must be applied via lines 1 to NCU 2. FIG. 9 is a diagram showing a general waveform of this ringing signal.

With reference to FIG. 9, this ringing signal has a definite frequency fc, a duration Tc and a rest period Tb. The conventional facsimile device having automatic receiving function stores in advance the characteristics of a ringing signal (frequency, duration, rest period, etc.) employed for lines connected with this facsimile device. When a signal having the same characteristics as those already stored in the device is supplied as an input, the facsimile device determines that there is a ringing, and thus performs a facsimile receiving operation.

That is, referring to FIG. 6, main controller 110 is constituted, in general, by a CPU (Central Processing Unit) including a memory. Patterns of the characteristics of the ringing signal employed for the lines are fixedly stored in this memory in advance.

A ringing signal transmitted from the switchboard is applied via NCU 2 to ringing signal detecting circuit 5.

Figure 7:
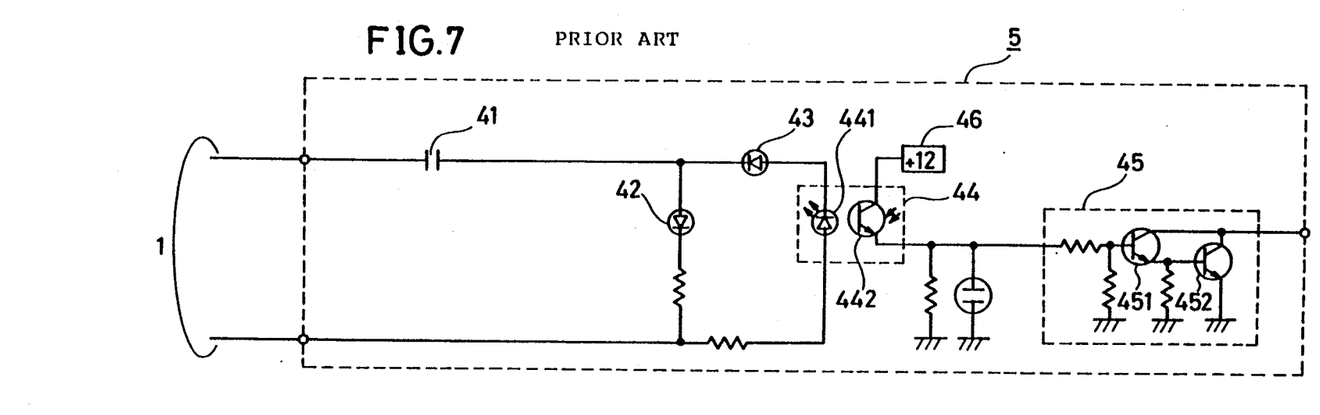
FIG. 7 is a circuit diagram showing general structure of a ringing signal detecting circuit.
Figure 8:
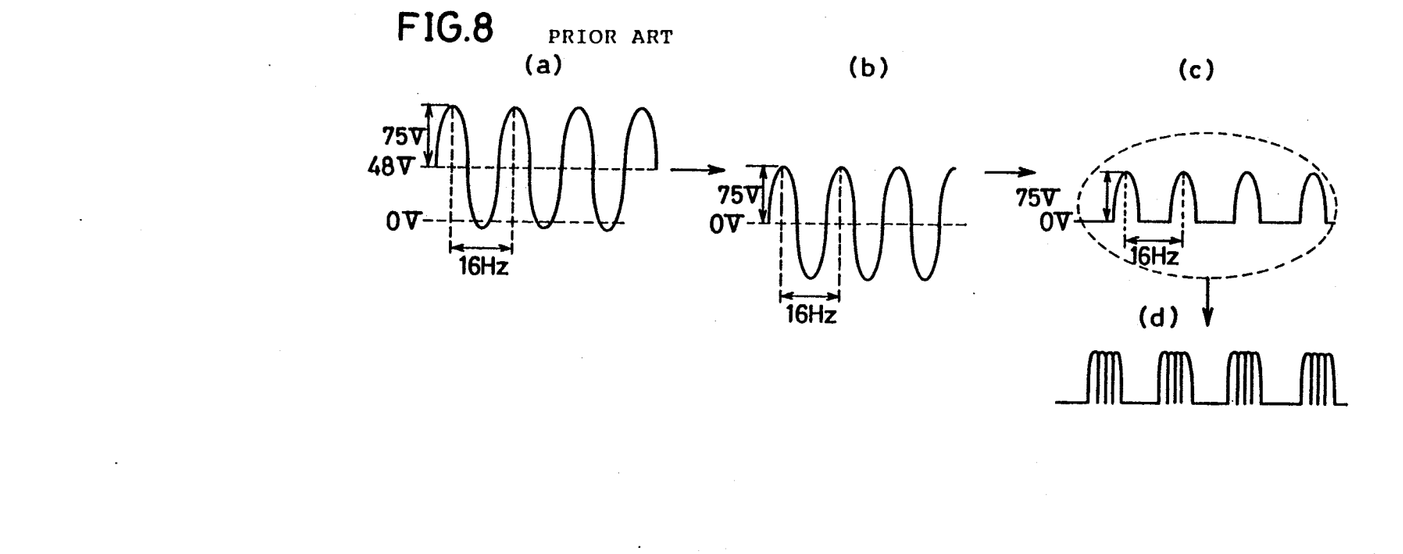

FIG. 7 is a circuit diagram showing one example of ringing signal detecting circuit 5 employed in the conventional facsimile device having automatic receiving function. FIG. 8 is a diagram showing signal waveforms appearing in the circuit shown in FIG. 7. It is assumed, for example, that a ringing signal having a waveform shown in FIG. 8 (a) is supplied as an input to this ringing signal detecting circuit. This supplied ringing signal is an alternate current signal of 75 V, 16 Hz, which is superimposed on DC48V, a direct current voltage of line 1. A condenser 41 serves to block a direct current component of DC48V of a voltage signal applied via line 1 and to extract only an alternate current component of 16 Hz shown in FIG. 8 (b). The alternate current component extracted by condenser 41 is subjected to half-wave rectification by diodes 42 and 43. This causes a signal having a waveform shown in FIG. 8 (c) to be applied to a light emitting diode 441 in a photocoupler 44. A light receiving transistor 442 in photocoupler 41 is rendered conductive in response to light emitted from light emitting diode 441, to apply an output voltage of a reference voltage source 46 to an amplifying/inverting circuit 45. Therefore, the signal subjected to the half-wave rectification by diodes 42 and 43 is applied through photocoupler 44 to amplifying/inverting circuit 45. Amplifying/inverting circuit 45 includes two NPN transistors 451 and 452 in Darlington connection. These transistors 451 and 452 invert an input signal to be applied amplifying/inverting circuit 45 and then provide a rectangular wave of 16 Hz as shown in FIG. 8 (d) to an output terminal of amplifying/inverting circuit 45.

Referring to FIG. 6 again, main controller 110 determines the characteristics of a ringing signal (frequency, duration, rest period, etc.) in response to the signal having the rectangular wave detected from ringing signal detecting circuit 5 as described above. When the pattern of the determined characteristics is identical to that of the ringing signal already stored in the memory of main controller 110, main controller 110 determines that there is a ringing and then initiates a series of control operations for receiving a picture signal.

Figure 10:
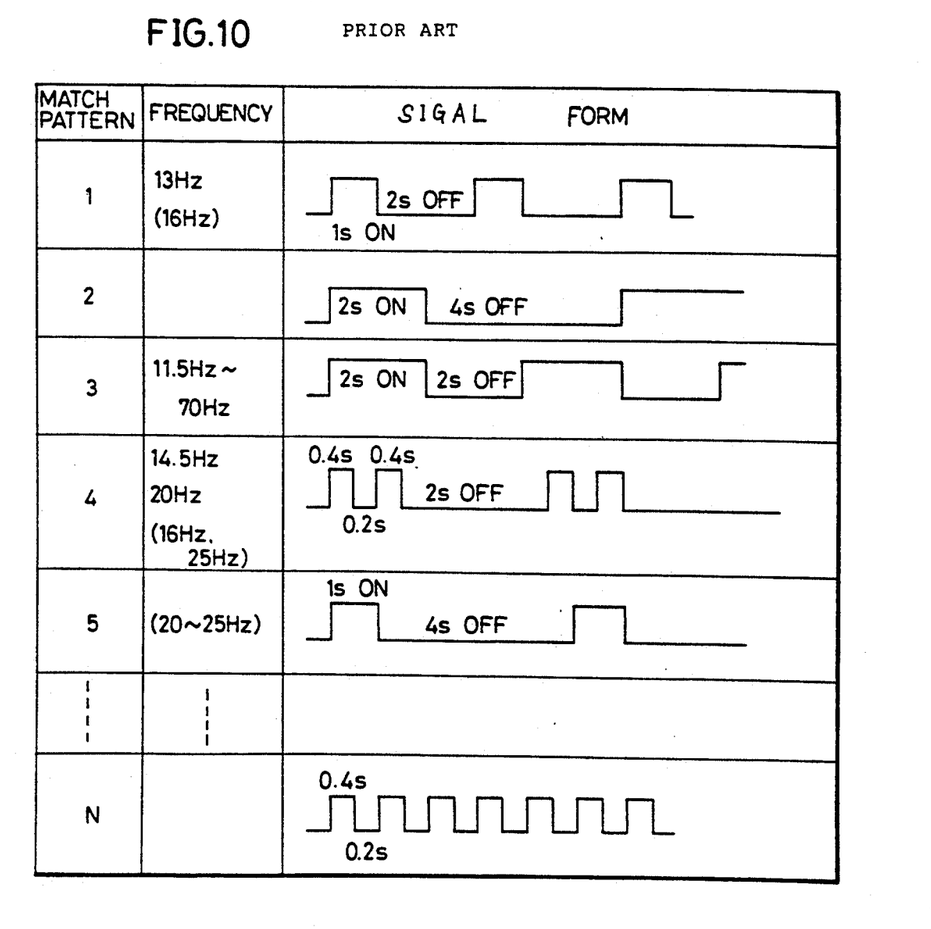
FIG. 10 is a waveform diagram showing ringing signals of different countries.

As described above, the conventional facsimile device should fixedly store, in advance, the characteristic pattern of a ringing signal on the lines connected with the facsimile device (hereinafter referred to as a match pattern). The ringing signal shown in FIG. 8 (a) is employed in public telecommunication lines in Japan. The characteristics of ringing signals are different for each country. FIG. 10 is a diagram showing an example of ringing signals having different characteristics employed in different countries. As shown in this diagram, the characteristics of the ringing signals vary in different countries. Thus, an individual match pattern, corresponding to each area where each facsimile device is installed, should be stored in a memory of a CPU or the like in each facsimile device, in the manufacture of the facsimile devices. Thus, the facsimile devices must be manufactured individually for their installation destinations. Therefore, the conventional facsimile device is disadvantageous with respect to its low production efficiency.

In addition, facsimile devices are not only connected directly to such public telecommunication lines but also to private branch exchanges (hereinafter referred to as PBX). For example, when a plurality of telecommunication devices share one public telecommunication line in a company and the like, an employed PBX is connected via the public line to a switchboard in a telecomunnication station, but via separate lines to those telecommunication devices. When a ringing signal is transmitted from the switchboard in the station onto the public line, the PBX transmits a ringing signal to any of the of telecommunication devices in response to the transmission of the ringing signal to the public line. Therefore, a match pattern corresponding to the ringing signal of the PBX must be stored in advance in a facsimile device connected to the PBX. There are, however, numerous types of ringing signals of the PBXs depending on the type of the PBXs or the like. Thus, it is very difficult as a practical matter to manufacture the facsimile devices having automatic receiving function separately according to different types of the PBXs connected with the devices. Moreover, the PBXs has been increasingly improved recently. Thus, there are some ringing signals of the PBXs that cannot be known to manufacturers these days. Therefore, there is another problem that a match pattern to be stored in advance in a facsimile device cannot be determined.

SUMMARY OF THE INVENTION

One object of the present invention is to provide a facsimile device capable of automatically receiving a picture signal, without fail, independent of characteristics of a ringing signal applied to a line actually connected with the facsimile device.

Another object of the present invention is to provide a facsimile device which does not have to be produced separately for each country where the facsimile device is installed.

A further object of the present invention is to provide a facsimile device which does not have to be produced separately, dependent, upon characteristics of a specific ringing signal corresponding to a PBX connected with the facsimile device.

A still further object of the present invention is to provide a facsimile device having an automatic receiving function, which does not have to be produced separately, dependent upon each country where the facsimile device is installed and on the type of a PBX connected with the facsimile device.

To accomplish the above objects, a facsimile device in accordance with the present invention, which is connected to a line through which a ringing signal and a picture signal are transmitted, includes a ringing signal detecting circuit, for detecting the ringing signal from the line, a characteristic determining circuit for determining characteristics of the ringing signal in accordance with a detection output of the ringing signal detecting circuit, first external operation means for selecting an automatic receive mode, second external operation means for selecting a characteristic setting mode, a storage circuit, a determination circuit, and a picture signal receiving circuit. The storage circuit stores the characteristics determined by the characteristic determining circuit when the characteristic setting mode is selected by the second external operation means. The determination circuit reads the characteristics stored in the storage circuit and determines whether or not the read characteristics match the characteristics determined by the characteristic determining circuit, when the automatic receive mode is selected by the first external operation means. The picture signal receiving circuit starts receiving a picture signal in response to a determination output of the determination circuit determining the match between the read characteristics and those determined by the characteristic determining circuit when the automatic receive mode is selected by the first external operation means.

Therefore, if a ringing signal is applied to the line after the facsimile device is connected to the line, and the characteristic setting mode is selected by the second external operation means, the ringing signal detecting circuit detects the applied ringing signal, and the characteristic determining circuit determines characteristics of the ringing signal detected by the ringing signal detecting circuit. Thus, the characteristics of this ringing signal are stored in the storage circuit. If the first external operation means thereafter selects the automatic receive mode, a ringing signal to be supplied as an input to the facsimile device via the line is processed by the ringing signal detecting circuit and the characteristic determining circuit. Further, the determination circuit thereafter determines whether or not the characteristics stored in the storage circuit match the characteristics of the ringing signal applied to the facsimile device in the automatic receive mode. Accordingly, the picture signal receiving circuit starts receiving a picture signal only when the characteristics of the ringing signal supplied as an input to the facsimile device in the automatic receive mode match those stored in the storage circuit in the characteristic setting mode.

According to a preferred embodiment, the foregoing ringing signal includes, as a single cycle, a first period in which an alternate current signal appears and a second period in which no signal appears, the alternate current signal having a definite frequency. The foregoing characteristics of the ringing signal include the definite frequency, and the first and second periods.

According to another aspect, a facsimile device in accordance with the present invention, which is connected to a line through which a ringing signal and a picture signal are transmitted, includes a ringing signal detecting circuit for detecting the ringing signal from the line, a characteristic determining circuit for determining characteristics of the ringing signal in accordance with a detection output of the ringing signal detecting circuit, first external operation means for selecting an automatic receive mode, second external operation means for selecting a characteristic setting mode, a storage circuit for storing, in advance, respective characteristics of an ringing signals of arbitrary number of types in a first region, a comparison circuit, a determination circuit, a picture signal receiving circuit, and a characteristic specifying circuit. The comparison circuit reads the respective characteristics of the ringing signals of arbitrary number of types from the storage circuit and then compares the read respective characteristics of the ringing signals with the characteristics determined by the characteristic determining circuit, when the second external operation means selects the characteristic setting mode. The determination circuit determines as to whether or not the characteristics determined by the characteristic determining circuit match predetermined characteristics when the first external operation means selects the automatic receive mode. The picture signal receiving circuit starts receiving a picture signal in response to a determination output of the determination circuit determining the match between the characteristics determined by the characteristic determining circuit and the predetermined characteristics when the first external operation means selects the automatic receive mode. The characteristic specifying circuit specifies the predetermined characteristics in accordance with a comparison output of the comparison circuit when the second external operation means selects the characteristic setting mode.

According to a preferred embodiment, the comparison circuit includes a reading circuit for reading the respective characteristics of the ringing signals of arbitrary number of types from the storage circuit, and a characteristic match detecting circuit for detecting that any of the characteristics of the ringing signals read by the reading circuit matches the characteristics determined by the characteristic determining circuit. The characteristic specifying circuit sets those the characteristics of the ringing signals read by the reading circuit, which match the characteristics determined by the characteristic determining circuit, to the predetermined characteristics in response to a detection output of the characteristic match detecting circuit, and sets the characteristics determined by the characteristic determining circuit to the predetermined characteristics in response to a non-detection output of the characteristic match detecting circuit.

Therefore, if a ringing signal is applied to the line after the facsimile device is connected to the line, and the second external operation means selects the characteristic setting mode, the ringing signal detecting circuit detects the applied ringing signal, and the characteristic determining circuit determines characteristics of the ringing signal detected by the ringing signal detecting circuit. Then, the comparison circuit compares the determined characteristics with the respective characteristics of the ringing signals of arbitrary number of types stored in advance in the storage circuit. Accordingly, if a ringing signal having the same characteristics as the characteristics of any of the ringing signals of arbitrary number of types stored in advance in the storage circuit is applied to the line, in the characteristic setting mode, a detection output is obtained from the characteristic match detecting circuit in the comparison circuit. As a result, the characteristic specifying circuit sets "predetermined characteristics" in the determination circuit to those of the characteristics stored in advance in the storage circuit, which match the characteristics of the ringing signal applied to the line in the characteristic setting mode. Accordingly, in this case, a reception of a picture signal starts in response to the match between the characteristics of the ringing signal supplied as an input to the facsimile device in the automatic receive mode and the characteristics of one of the ringing signals of arbitrary number of types stored in advance in the storage circuit, which is actually applied to the line.

Conversely, if the characteristics of the ringing signal applied to the line in the characteristic setting mode do not match any of those of the arbitrary number of types of ringing signals stored in advance in the storage circuit, no detection output is obtained from the characteristic match detecting circuit. As a result, the characteristic specifying circuit sets the "predetermined characteristics" in the determination circuit as the characteristics of the ringing signal applied to the line in the characteristic setting mode. Accordingly, in this case, the reception of a picture signal starts in response to the match between the characteristics of the ringing signal supplied as an input to the facsimile device in the automatic receive mode and those of the ringing signal applied to the line in the characteristic setting mode.

According to another preferred embodiment, the characteristic specifying circuit includes a first storing circuit, a second storing circuit and a supply circuit. The first storing circuit stores a location in the storage circuit where the matching characteristics are stored, into a second region of the storage circuit in response to a detection output of the characteristic match detecting circuit. The second storing circuit stores the characteristics determined by the characteristic determining circuit into a third storage region of the storage circuit and stores a location in the storage circuit where the characteristics determined by the characteristic determining circuit are stored, into the second region of the storage circuit, in response to a non-detection output of the characteristic match detecting circuit. The supply circuit reads the storage location from the second region of the storage circuit and supplies the characteristics stored in the read storage location as "predetermined characteristics" to the determination circuit when the first external operation means selects the automatic receive mode. The storage circuit includes, for example, a first memory, in which a single writing is enabled, and reading is only enabled after the writing, and a second memory, in which reading and writing are enabled any number of times. The first and third regions may be set in the first memory, and the second region may be set in the second memory.

According to still another aspect, a facsimile device in accordance with the present invention, which is connected with a line through which a ringing signal and a picture signal are transmitted, is characterized in that the facsimile device includes an automatic receive mode and a characteristic setting mode. In the automatic receive mode, a reception of a picture signal automatically starts in response to a match between characteristics of a ringing signal transmitted via the line to this facsimile device and predetermined characteristics. In the characteristic setting mode, the characteristics of the ringing signal transmitted via the line to this facsimile device is set to the predetermined characteristics in the automatic receive mode.

Therefore, if the facsimile device is set to operate in the characteristic setting mode after connected to the line, the characteristics of the ringing signal actually transmitted onto the line are set to the predetermined characteristics required for the automatic reception of a picture signal. Thus, if the facsimile device is first set to operate in the characteristic setting mode and then in the automatic receive mode, the reception of the picture signal automatically starts responsive to a call from the facsimile device.

Furthermore, to accomplish the foregoing objects, an automatic receiving method of a facsimile device in accordance with the present invention includes the steps of: connecting the facsimile device to a line, through which a ringing signal and a picture signal are transmitted; detecting a ringing signal applied from the line after the step of connecting the facsimile device to the line; determining characteristics of the detected ringing signal; storing the determined characteristics into a storage circuit; detecting the supplied ringing signal from the line after the determined characteristics are stored in the storage circuit, and determining the characteristics of the detected ringing signal; reading the stored characteristics from the storage circuit in response to the supply of the ringing signal to the line after the determined characteristics are stored in the storage circuit; and confirming the match between the characteristics determined in this step and the characteristics read from the storage circuit.

As has been described, the automatic receiving method of the facsimile device in accordance with the present invention includes the steps of: storing the characteristics of the ringing signal, which is actually applied to the line connected with the facsimile device, into the storage circuit after the facsimile device is connected to the line; and confirming a match between characteristics of a ringing signal which is thereafter transmitted to the line and the characteristics stored in the storage circuit. Accordingly, if the facsimile device is set to be able to receive a picture signal in response to the confirmation of the match therebetween in the confirmation step, the reception of the picture signal by the facsimile device automatically starts without fail in response to the transmission of a ringing signal from a switchboard to the line.

Since the facsimile device and the automatic receiving method thereof in accordance with the present invention have the foregoing structure and steps, the facsimile device can start receiving a picture signal without fail in response to a call from the switchboard, even if the characteristics of a specific ringing signal corresponding to a line actually connected with the facsimile device are not stored in the facsimile device in advance. Therefore, it is unnecessary to produce the facsimile devices individually for their corresponding destinations or dependently on the type of PBXs connected with the facsimile devices in order to achieve the automatic receiving function. Further, since users can easily set match patterns, it is unnecessary for the users to request manufacturers, sales companies and the like to provide service of changing the match patterns even if there are any changes in regions where the facsimile devices are to be installed or in types of PBXs, to which the facsimile devices are connected.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 5(a) and (b) are diagrams showing a data-stored state in a memory 27 of FIG. 3;

FIGS. 8(a)–(d) are waveform diagrams for explaining an operation of the ringing signal detecting circuit shown in FIG. 7;

DESCRIPTION OF THE PREFERRED EMBODIMENTS

The present invention will now be described in detail according to the following embodiments.

Figure 1:
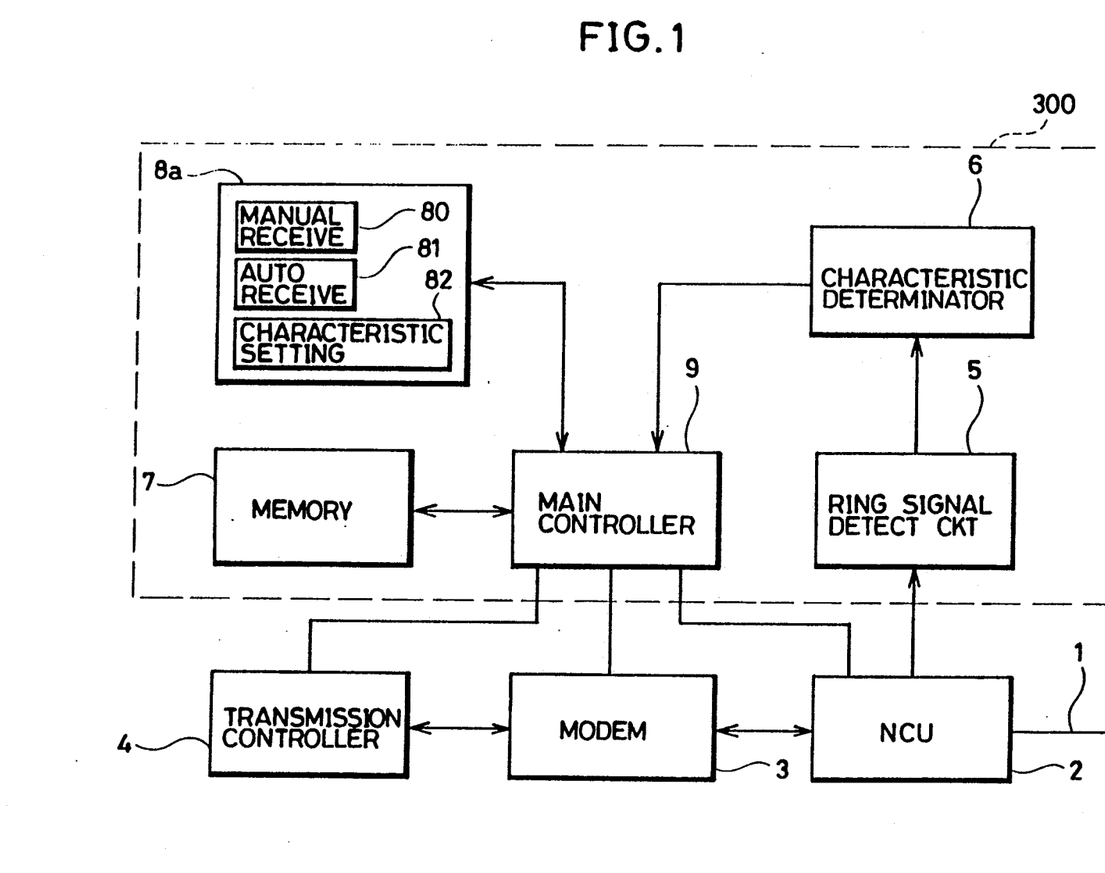
FIG. 1 is a block diagram showing structure of a ringing signal processing system of a facsimile device according to one embodiment of the present invention.

FIG. 1 is a block diagram showing a partial structure of a facsimile device of one embodiment of the present invention. FIG. 1 mainly shows a ringing signal processing system for processing a ringing signal from lines. Since the structure of a picture signal processing system for transmission/reception of and processing of a picture signal is the same as the conventional structure, a description thereof and the illustration of function portions other than modem 3 and transmission controller 4 will not be repeated. The function and operation of NCU2, modem 3, transmission controller 4 and ringing signal detecting circuit 5 are the same as the corresponding conventional elements. A circuit having the configuration shown in FIG. 7, for example, may be employed for ringing signal detecting circuit 5 in the same manner as the conventional circuit.

Unlike the conventional facsimile device, this facsimile device also has a characteristic setting mode, in which users can store characteristics of a ringing signal transmitted from a switchboard (not shown) onto a line 1, into this facsimile device, along with the automatic receive mode and the manual receive mode. Thus, an operation panel 8a is structured so that the users can select each of the automatic receive mode, manual receive mode and characteristic setting mode. For example, operation panel 8a includes a keying switch 80 for setting this facsimile device in the manual receive mode, a keying switch 81 for setting the device in the automatic receive mode, and a keying switch 82 for setting the device in the characteristic setting mode. As a matter of course, operation panel 8a includes other keying switches, a display panel and the like that are conventionally required by the users to operate the conventional facsimile device having the automatic receive mode, together with those keying switches 80–82.

Figure 2:
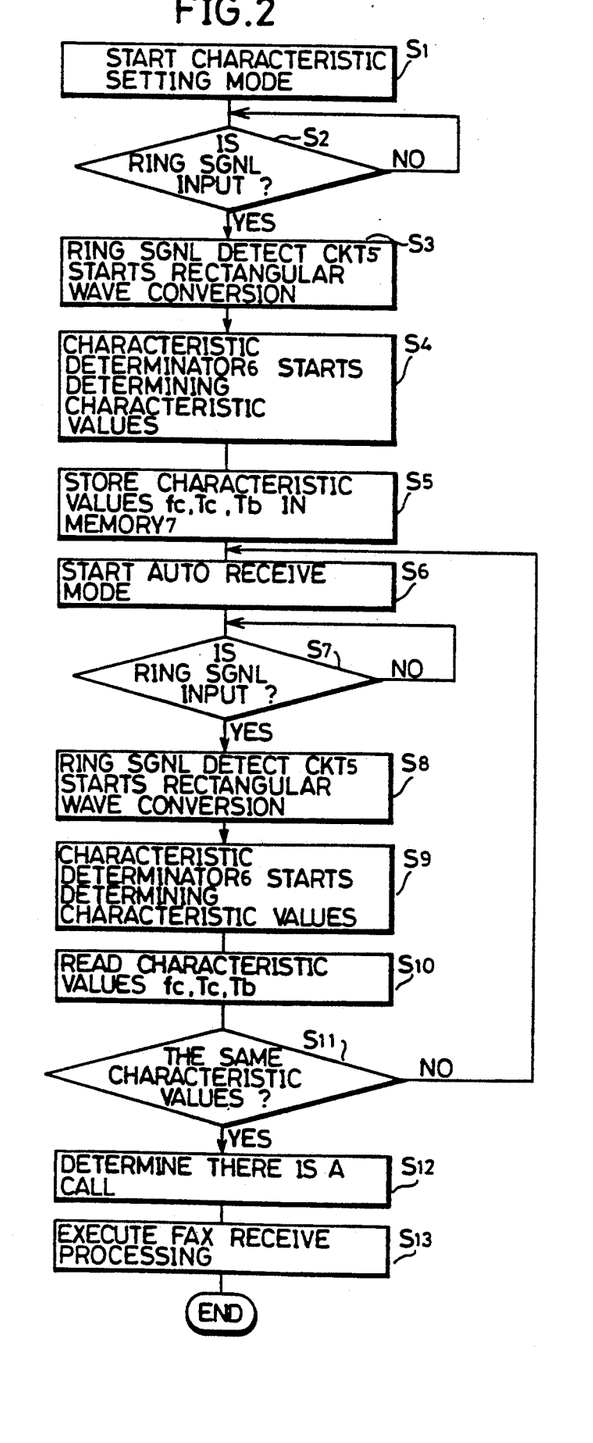
FIG. 2 is a flow chart for explaining an operation of a main controller 9 in FIG. 1.

A detailed description will now be given on structure and operation of a ringing signal processing system 300 in this facsimile device, with reference to FIGS. 1 and 2. FIG. 2 is a flow chart for explaining operation of a main controller 9 in FIG. 1.

In the following description, main controller 9 is constituted by a one-chip CPU or the like operating according to the program shown in the flow chart of FIG. 2.

With reference to FIG. 1, ringing signal processing system 300 includes a ringing signal detecting circuit 5, a characteristic determinator 6, a memory 7 and a main controller 9. Characteristic determinator 6 determines characteristics of a ringing signal (frequency, duration, rest period, etc.) in accordance with a detection signal of ringing signal detecting circuit 5 (e.g., the rectangular wave shown in FIG. 8 (d)). Main controller 9 controls the entire facsimile device in response to a key entry to operation panel 8a. Main controller 9 particularly controls ringing signal processing system 300 in response to key entries to keying switches 80–82. Memory 7 serves to store output data of main controller 9 and to supply storage data as an output to main controller 9. A description will now be given of the operation of ringing signal processing system 300 in the characteristic setting mode and the automatic receive mode.

This facsimile device does not store a match pattern in advance at its manufacture stage unlike the conventional facsimile device, but stores the match pattern after it is installed on its actual location. That is, after this facsimile device is connected to line 1 in that location, users of this device press keying switch 82, to set the device in the characteristic setting mode. In other words, main controller 9 enters in the characteristic setting mode in response to the pressing of keying switch 82 (step S1). The users then call this facsimile device from other telephone and the like. Accordingly, a ringing signal having characteristics specific to a switchboard or to that location is transmitted from the switchboard via line 1 to this facsimile device.

Main controller 9 makes a determination at all times as to whether or not a ringing signal is included in an output of NCU 2 which is to be supplied to the facsimile device (step S2). If the output of NCU 2 includes the ringing signal, main controller 9 activates ringing signal detecting circuit 5 and characteristic determinator 6 (steps S3, S4). Thus, the ringing signal transmitted onto line 1 is input through NCU 2 to ringing signal detecting circuit 5 and then converted into a rectangular wave signal by this detecting circuit, as already described in the conventional example. Then, characteristic determinator 6 determines a frequency fc, a duration Tc and a rest period Tb, which are characteristic values of the ringing signal, in response to the above rectangular wave signal. The characteristic determinator 6 then supplies the determined characteristic values to main controller 9. Main controller 9 stores those characteristic values fc, Tc and Tb as a match pattern into memory 7 (step S5).

In the above manner, the match pattern is stored in the facsimile device in the characteristic setting mode. Accordingly, if this facsimile device thereafter operates in the same manner as the conventional, the device can automatically become a receiving state. Thus, after storing the match pattern into memory 7 in the characteristic setting mode, the users may press keying switch 81 to set the facsimile device to operate in the automatic receive mode.

Main controller 9 proceeds to the automatic receive mode in response to the pressing of keying switch 81 (step S6). When proceeding to the automatic receive mode, main controller 9 makes a determination at all times as to whether or not the output of NCU 2 to be supplied to the facsimile device includes a ringing signal, as it does in the characteristic setting mode (step S7). When the ringing signal is included in the output of NCU 2, main controller 9 activates ringing signal detecting circuit 5 and characteristic determinator 6 (steps S8, S9).

Accordingly, in the automatic receive mode, when the ringing signal is transmitted from the switchboard onto line 1, ringing signal detecting circuit 5 and characteristic determinator 6 operate in the same manner as in the characteristic setting mode. This causes the characteristic values of this ringing signal to be supplied from characteristic determinator 6 to main controller 9. Main controller 9 reads the characteristic values (fc, Tc and Tb) stored as a match pattern in memory 7 in advance as described above (step S10), and makes a determination as to whether or not the read characteristic values are the same as those supplied from characteristic determinator 6 (step S11). Then, main controller 9 determines that this facsimile device is called only when determining that the read characteristic values are the same as those supplied from the characteristic determinator (step S12). The main controller 9 then proceeds to the next execution routine for controlling the picture signal processing system including modem 3 and transmission controller 4 so that this facsimile device can receive a picture signal (step S13), and completes all the processings in the automatic receive mode.

As mentioned above, the facsimile device of this embodiment determines, after connected to line 1 in the actual location, characteristic values of a read signal to be actually transmitted onto line 1, then stores the determined characteristic values as a match pattern and thereafter matches the stored match pattern with a characteristic pattern of a receive signal, thereby to perform automatic receiving. Thus, it is unnecessary to store the characteristics of a specific ringing signal for each destination into the facsimile device of this embodiment in advance at the stage of production. Therefore, it is unnecessary to produce the facsimile devices of this embodiment separately for their individual destinations as required in the production of the conventional facsimile devices.

Figure 3:
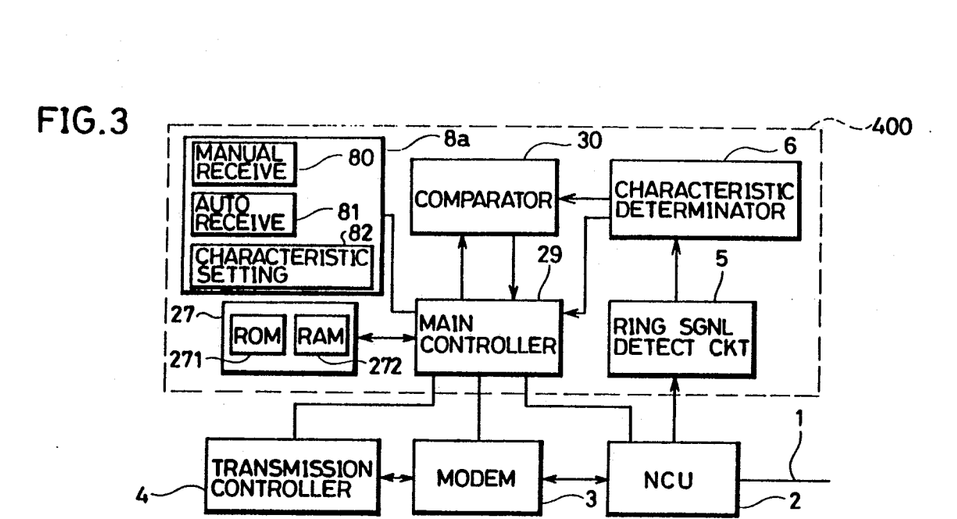
FIG. 3 is a block diagram showing structure of a ringing signal processing system of a facsimile device according to another embodiment of the present invention.

FIG. 3 is a block diagram showing partial structure of a facsimile device according to another embodiment of the present invention. FIG. 3 mainly shows structure of a ringing signal processing system similarly to FIG. 1. Since the structure, function and operation of other portions of this facsimile device than a ringing signal processing system 400 are the same as those in FIG. 1, a description thereof will not be repeated here.

Figure 4:
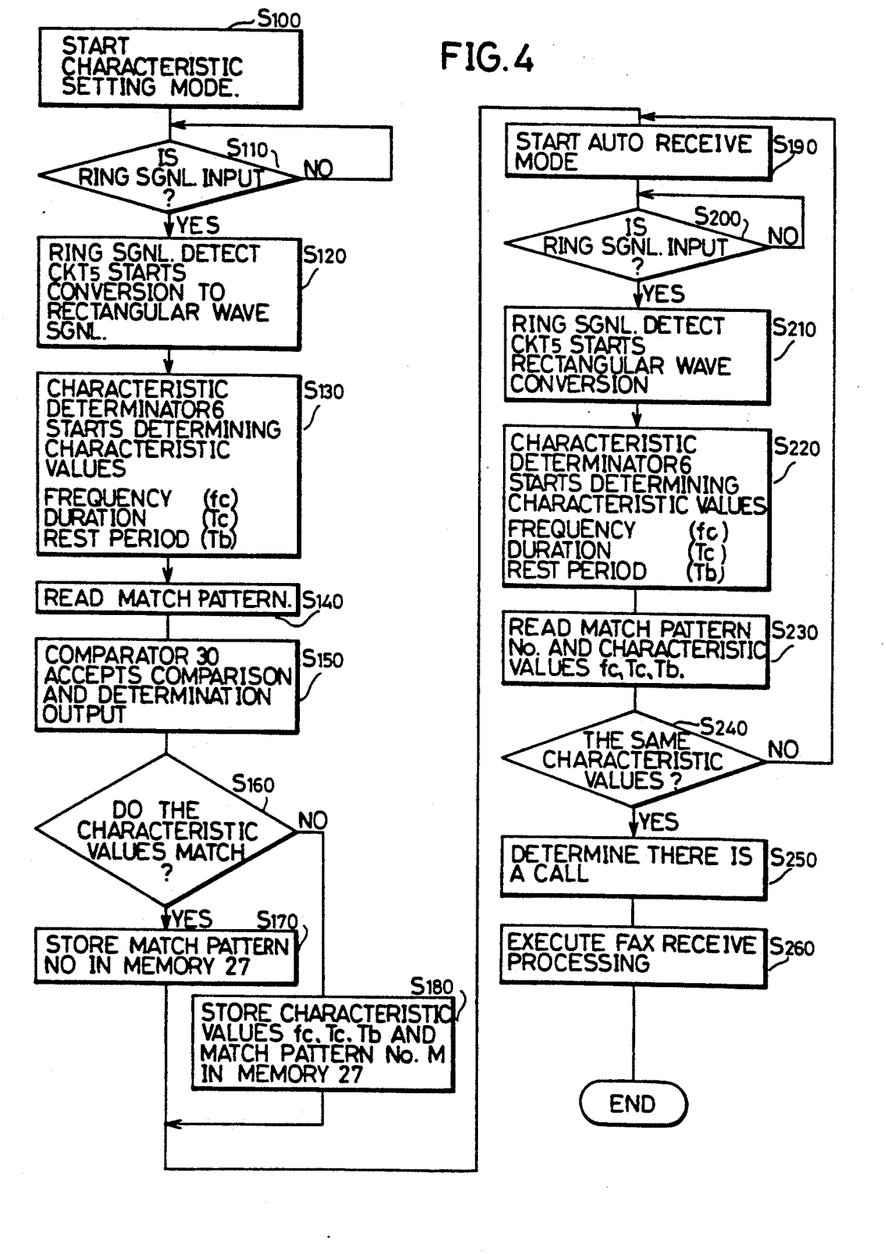
FIG. 4 is a flow chart for explaining an operation of a main controller 29 in FIG. 3.

The facsimile device of this embodiment also has a manual receive mode, an automatic receive mode and a characteristic setting mode like the facsimile device of the former embodiment. A detailed description will now be given of operation of ringing signal processing system 400 in the automatic receive mode and the characteristic setting mode, with reference to FIGS. 3 and 4. FIG. 4 is a flow chart for explaining operation of a main controller 29 in FIG. 3.

In the following description, main controller 29 is constituted by a one-chip CPU or the like operating according to the program shown in the flow chart of FIG. 4.

Ringing signal processing system 400 in this facsimile device includes a memory 27, main controller 29, a comparator 30, and the same ringing signal detecting circuit 5 and the same characteristic determinator 6 as those in the former embodiment.

Figure 5:
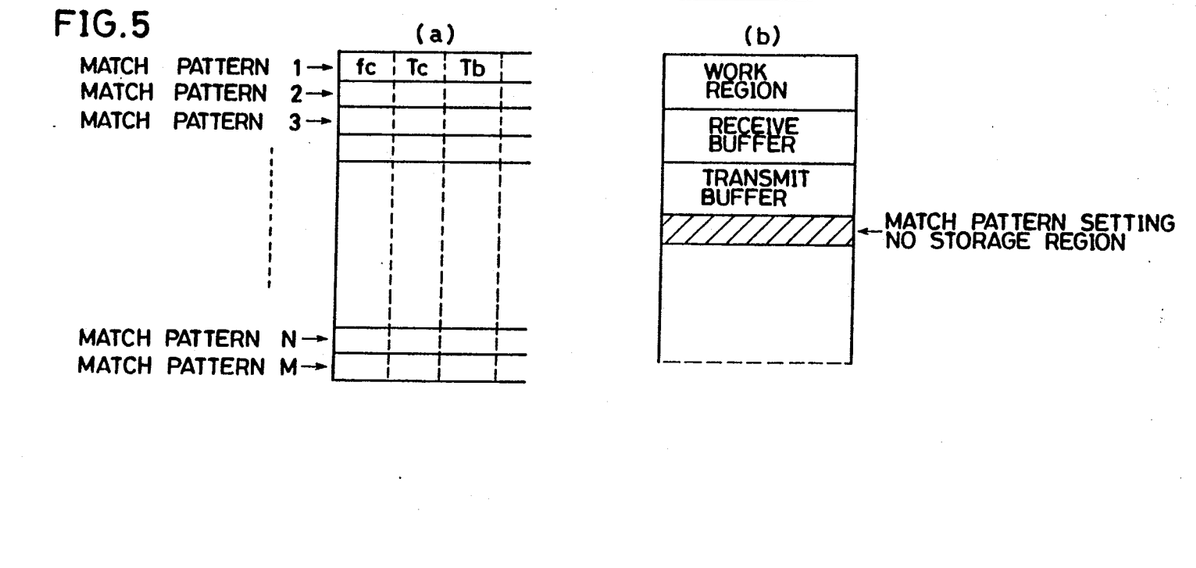

Memory 27 includes a data-fixed memory 271 such as a ROM (Read Only Memory), in which a match pattern of each country is previously stored at the production stage of this facsimile device. FIG. 5 (a) shows a state where match patterns are stored in this data-fixed memory 271. As shown in FIG. 5 (a), three characteristic values, i.e., frequency fc, duration Tc and rest period Tb of a ringing signal employed in each of arbitrary number (N) of countries are stored as match patterns in a predetermined address. Comparator 30 serves to compare characteristic values supplied by characteristic determinator 6 with those stored in this memory 27. Main controller 29 serves to control the entire facsimile device in response to a key entry to operation panel 8a. In response to key entries into keying switches 80-82, in particular, main controller 29 control this ringing signal processing system 400.

In this embodiment also, like the former embodiment, users store match patterns into this facsimile device at the actual location. That is, after connecting the facsimile device of this embodiment to a line 1 in the actual location, the users press keying switch 82 to set this facsimile device to operate in the characteristic setting mode. After that, the users call this facsimile device from other telephone or the like. Accordingly, a ringing signal having characteristics specific to that country or specific to an employed switchboard, not shown, is transmitted from the switchboard onto line 1. This transmitted ringing signal is accepted by the facsimile device through NCU 2.

Main controller 29 enters in the characteristic setting mode in response to the pressing of keying switch 82 (step S100) and then makes a determination at all times as to whether or not an output of the NCU 2 includes a ringing signal (step S110). If the output of NCU 2 includes the ringing signal; main controller 29 activates ringing signal detecting circuit 5 and characteristic determinator 6 (steps S120, S130). As a result, when NCU 2 accepts the ringing signal, ringing signal detecting circuit 5 and characteristic determinator 6 operate in the same manner as in the former embodiment. Accordingly, characteristic values (frequency fc, duration Tc, rest period Tb, etc.) of this ringing signal are supplied as an output from characteristic determinator 6. These characteristic values are input to comparator 30. In response to this, comparator 30 informs main controller 29 that the characteristic values are supplied by characteristic determinator 6. In response to this, main controller 29 sequentially reads N match patterns stored in the data-fixed memory 271 of memory 27 and supplies the same to comparator 30 (step S140).

Comparator 30 makes a comparison between each of the N match patterns read from this memory 27 and the characteristic pattern from characteristic determinator 6 and determines whether or not these patterns match each other. Further, comparator 30 outputs a signal for informing main controller 29 of the result of this determination.

Main controller 29 accepts this applied signal from comparator 30 (step S150). Further, main controller 29 makes a determination as to whether or not the accepted signal indicates a match between the n-th ($1 \leq n \leq N$) match pattern from memory 27 and the characteristic pattern from characteristic determinator 6 (step S160). If the n-th match pattern from memory 27 matches the characteristic pattern from characteristic determinator 6, main controller 29 stores the number n of this matching match pattern in a match pattern setting number storage region of memory 27 (step S170). Conversely, if none of the N match patterns match the characteristic pattern determined by characteristic determinator 6, main controller 29 stores the determined characteristic pattern as the M-th ($M>N$) match pattern into a match pattern storage region of memory 27 (step S180). Simultaneously, main controller 29 stores the number M of the match pattern, which is stored in the match pattern storage region at that time, into the match pattern setting number storage of memory 27 (step S180).

Memory 27 includes data-fixed memory 271, in which N match patterns are stored in advance, and a readable and writable memory 272 such as a RAM enabling both reading and writing. Data-fixed memory 271 employs, for example, a PROM (Programmable ROM) in which data can be written only once after the manufacture. The above-described match pattern setting number storage region is set in the readable and writable memory 272, and the above-described match pattern storage region is set in data-fixed memory 271. FIG. 5 (b) shows a data storage state in the readable and writable memory 272. As shown in FIG. 5 (b), the readable and writable memory 272 includes the match pattern setting number storage region along with a work region for executing various determining operations in various types of modes, a receive buffer region employed in receiving of a picture signal, a transmit buffer region employed in transmission of a picture signal, etc. The math pattern storage region includes, as shown in FIG. 5 (a), a region where the N match patterns are stored and a region where the M-th match pattern is to be stored.

As described above, in this embodiment, memory 27 stores the result which number of the match patterns stored in the match pattern storage region of memory 27 matches the characteristic pattern of a ringing signal actually transmitted from the switchboard onto line 1. In other words, the characteristic pattern of a ringing signal to be actually applied to this facsimile device is stored in this facsimile device. Accordingly, operating this facsimile device in the same manner as the conventional thereafter enables the facsimile device to automatically receive a picture signal. Thus, users should merely set this facsimile device to operate in the automatic receive mode by pressing keying switch 81 after storing the number of the characteristic pattern of the actual ringing signal into the facsimile device as described above.

Main controller 29 enters in the automatic receive mode in response to the pressing of keying switch 81 (step S190) and then determines at all times whether or not the output of NCU 2 includes a ringing signal (step S200). If the output of NCU 2 includes the ringing signal, main controller 29 activates ringing signal detecting circuit 5 and characteristic determinator 6 (steps S210, S220). Thus, when a ringing signal is applied from line 1 to NCU 2 in the automatic receive mode, ringing signal detecting circuit 5 and characteristic determinator 6 operate in the same manner as in the characteristic setting mode. Accordingly, main controller 29 is supplied with characteristic values of this ringing signal by characteristic determinator 6. In response to the supply of the characteristic values, main controller 29 reads a match pattern number from the match pattern setting number storage region of memory 27 and subsequently, reads a match pattern corresponding to the read number from the match pattern storage region of memory 27 (step S230). Main controller 29 then determines whether or not the read match pattern matches the characteristic pattern supplied by characteristic determinator 6 (step S240). Only when these patterns match each other, main controller 29 determines that this facsimile device is called (step S250), then proceeds to an execution routine for controlling the picture signal processing system including modem 3 and transmission controller 4 (step S260) and then completes all the processings in the automatic receive mode.

As aforementioned, the facsimile device of this embodiment includes memory 27 storing in advance the characteristic values of the ringing signal of each country. After connected to line 1 at the actual location, the facsimile device determines the characteristic values of a ringing signal to be actually applied to this line 1. If the determined characteristic values match any of the characteristic values previously stored in memory 27, the facsimile device sets the matching characteristic values in a match pattern employed in the automatic receive mode. Conversely, if the determined characteristic values do not match any of those stored previously in memory 27, the device sets the determined characteristic values in the employed match pattern. It is therefore unnecessary to previously store the characteristics of ringing signals for their individual destinations in the facsimile devices of this embodiment at the production stage of the devices. Consequently, the production of different types of facsimile devices, which has been required for the conventional facsimile devices, is unnecessary either in production of the facsimile devices of this embodiment.

As to operation in the manual receive mode, the facsimile devices of the foregoing both embodiments operate in the same manner as the conventional facsimile device. In the manual receive mode, when a ringing signal is transmitted from a switchboard onto line 1, the bell of a telephone connected to this line 1 together with a facsimile device rings. In response to this ringing of the bell, users should merely perform a keying operation (hereinafter referred to as a picture signal reception starting operation) through operation panel 8a so as to enable the facsimile device to receive a picture signal. That is, in FIG. 1, when keying switch 80 is pressed to set the facsimile device to operate in the manual receive mode, main controller 9 waits for the picture signal reception starting operation through operation panel 8a, so that ringing signal detecting circuit 5, characteristic determinator 6 and memory 7 do not function. Then, when the picture signal reception starting operation is made through operation panel 8a, the operation of main controller 9 proceeds to an execution routine for receiving a picture signal to complete all the processings in the manual receive mode of main controller 9. Similarly, in FIG. 3, when keying switch 80 is pressed to set the facsimile device to operate in the manual receive mode, main controller 29 waits for the picture signal reception starting operation through operation panel 8a, so that ringing signal detecting circuit 5, characteristic determinator 6, memory 27 and comparator 30 do not function. Then, when the picture signal reception starting operation is made through operation panel 8a, the operation of main controller 29 proceeds to an execution routine for receiving a picture signal to complete all the processings in the manual receive mode of main controller 29.

While the foregoing description has been made on condition that both main controllers 9 and 29 are constituted by one-chip CPUs or the like operating according to predetermined programs in the foregoing embodiments, main controller 9 may be constituted by hardware that performs an operation equivalent to the flow chart shown in FIG. 2 without following any programs, and similarly, main controller 29 may be constituted by hardware that performs an operation equivalent to the flow chart shown in FIG. 4 without following any programs.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of operation of a facsimile device connected to a line through which a ringing signal and a picture signal are transmitted, comprising the steps of:
   (a) detecting a ringing signal from the line;
   (b) determining a plurality of characteristics of the detecting ringing signal forming a characteristic pattern in accordance with a detected output of step (a);
   (c) selecting one of an automatic receive mode and a characteristic setting mode;
   (d) prestoring, in a first region of a memory, a plurality of respective predetermined characteristic patterns, each including at least one of a plurality of characteristics of an arbitrary number of types of ringing signals;
   (e) reading the plurality of respective prestored predetermined characteristic patterns of the arbitrary number of types of ringing signals, in response to selection of one of the characteristic setting mode and automatic receive mode, and comparing the read respective prestored predetermined characteristic patterns of the arbitrary number of types of ringing signals with the characteristic pattern determined in step (b);
   (f) determining whether or not the determined characteristic pattern of step (b) matches at least one of the read respective prestored predetermined characteristic patterns, in response to selection of the automatic receive mode;
   (g) starting a reception of the picture signal in response to an output of step (f) determining a match, and to selection of the automatic receive mode in step (c); and
   (h) storing at least one of the plurality of characteristics of the detected ringing signal as a stored characteristic pattern and a pattern number for accessing the stored characteristic pattern of the detected ringing signal in accordance with an output of step (e), in response to selecting the characteristic setting mode in step (c).

2. The method of claim 1, wherein step (e) further comprises the substeps of:
   (i) reading the plurality of respective prestored predetermined characteristic patterns of the arbitrary number of types of ringing signals, and
   (ii) detecting a match between any one of the prestored predetermined characteristic patterns of the arbitrary number of types of ringing signals read in step (i) and the characteristic pattern of the detected ringing signal in step (b); and
   wherein step (h) includes the substeps of,
   (i) setting, as the stored characteristic pattern of the detected ringing signal, the prestored predetermined characteristic pattern read in step (e) which matches the characteristic pattern determined in step (b) and storing a pattern number for accessing the stored characteristic pattern in a second region of the memory, in response to a match detection output of step (e)(ii), and
   (ii) storing at least one of the plurality of characteristics determined in step (b) as the stored characteristic pattern of the detected ringing signal in the third region of the memory, and a pattern number for accessing the stored characteristic pattern in the second region of the memory, in response to a non-match detection output of step (e)(ii).

3. A facsimile device connected to a line through which a ringing signal and a picture signal are transmitted, comprising:
   ringing signal detecting means for detecting a ringing signal from the line;
   characteristic determining means for determining a plurality of characteristics of the detected ringing signal forming a characteristic pattern in accordance with a detected output of said ringing signal detecting means;
   first mode selection means for selecting an automatic receive mode;
   second mode selection means for selecting a characteristic setting mode;
   storage means for prestoring, in a first region, a plurality of respective predetermined characteristic patterns, each including at least one of a plurality of characteristics, of an arbitrary number of types of ringing signals;
   comparison means, responsive to one of said first and second mode selection means selecting one of said automatic receive mode and characteristic setting mode, respectively, for reading the plurality of respective prestored predetermined characteristic patterns of the arbitrary number of types of ringing signals from said storage means, and for comparing the read respective prestored predetermined characteristic patterns of the arbitrary number of types of ringing signals with the characteristic pattern predetermined by said characteristic determining means;

determination means for determining whether of not the characteristic pattern determined by said characteristic determining means matches at least one of the read respective prestored predetermined characteristic patterns, in response to said first mode selection means selecting the automatic receive mode;

picture signal receiving means for starting a reception of said picture signal in response to an output of said determination means determining a match and to the first mode selection means selecting the automatic receive mode; and characteristic specifying means for storing at least one of the plurality of characteristics of the detected ringing signal as a stored characteristic pattern and a pattern number for accessing the stored characteristic pattern of the detected ringing signal in accordance with an output of said comparison means, in response to said second mode selection means selecting the characteristic setting mode.

4. The facsimile device according to claim 3, wherein said comparison means includes reading means for reading the plurality of respective prestored predetermined characteristic patterns of the arbitrary number of types of ringing signals from said storage means, and characteristic match detecting means for detecting a match between any one of the respective prestored predetermined characteristic patterns of the arbitrary number of types of ringing signals read by said reading means and the characteristic pattern of the detected ringing signal determined by said characteristic determining means; and said characteristic specifying means setting, as said stored characteristic pattern of the detected ringing signal, the prestored predetermined characteristic pattern read by said reading means which matches the characteristic pattern determined by said characteristic determining means and storing a pattern number for accessing the stored characteristic pattern in a second region of the storage means, in response to a match detection output of said characteristic match detecting means, said characteristic specifying means further storing at least one of the plurality of characteristics determined by said characteristic determining means as the stored characteristic pattern of the detected ringing signal in a third region of the storage means, and storing a pattern number for accessing the stored characteristic pattern in the second region of the storage means, in response to a non-match detection output of said characteristic match detecting means.

5. The facsimile device according to claim 4, wherein said characteristic specifying means includes first storing means, responsive to the output of said characteristic match detecting means indicating match detection, for storing the pattern number for accessing the stored characteristic pattern, indicating a location of the matching characteristic pattern previously stored, in the second region of said storage means, second storing means, responsive to an output of said characteristic match detecting means indicating non-match detection, for storing at least one of the plurality of characteristics determined by said characteristic determining means as the stored characteristic pattern of the detected ringing signal in the third storage region of said storage means and for storing the pattern number for accessing the stored characteristic pattern, indicating the location of the stored characteristic pattern including at least one of the plurality of characteristics determined by said characteristic determining means in said second region of said storage means, and supply means, responsive to said first mode selection means selecting said automatic receive mode, for reading the pattern number indicating location, from the second region of the storage means to supply the characteristic pattern stored in the read storage location as the stored characteristic pattern, to said determination means.

6. The facsimile device according to claim 5, wherein said storage means includes, a first memory for enabling a single writing and enabling only reading after the single writing, and a second memory for enabling multiple reading and writing, said first memory including the first region and the third region, said second memory including the second region.

7. The facsimile device according to claim 3, wherein the ringing signal includes, as a signal cycle, a first period in which an alternate current signal appears and a second period in which no signal appears, the alternate current signal having a definite frequency; and the plurality of characteristics include the definite frequency, and the first and second periods.

* * * * *